United States Patent

Baker et al.

[15] 3,655,041
[45] Apr. 11, 1972

[54] ELECTRONIC COMPONENT HANDLER AND TESTER

[72] Inventors: Alexander Baker, Delran, N.J.; Eugene A. Vosika, New Brighton, Minn.

[73] Assignee: Integrated Mechanical Systems, Inc., Minneapolis, Minn.

[22] Filed: Apr. 23, 1970

[21] Appl. No.: 31,264

[52] U.S. Cl. ............................................209/81, 324/62 R
[51] Int. Cl. .....................................................B07c 5/344
[58] Field of Search ....................209/81, 73, 74, 75; 324/62

[56] References Cited

UNITED STATES PATENTS 3,073,446  1/1963  Wilson..................................209/81
3,413,553  11/1968  Genualdi................................209/81 X

*Primary Examiner*—Richard A. Schacher
*Attorney*—Stryker and Jacobson

[57] ABSTRACT

A machine to handle integrated circuits is disclosed wherein the circuits slide into slots in a wheel with the leads along side the wheel. Kelvin type contacts engage these leads and connect the integrated circuit to suitable testing circuits. The wheel then rotates a quarter turn to where the circuit is ejected into a storage tube if the testing circuits so indicate. If not the circuit falls out of the wheel during the next quarter turn into a reject bin.

11 Claims, 9 Drawing Figures

PATENTED APR 11 1972　　　　　　　　　　　3,655,041

INVENTORS
EUGENE A. VOSIKA
ALEXANDER BAKER

BY Stryker & Jacobson
ATTORNEYS

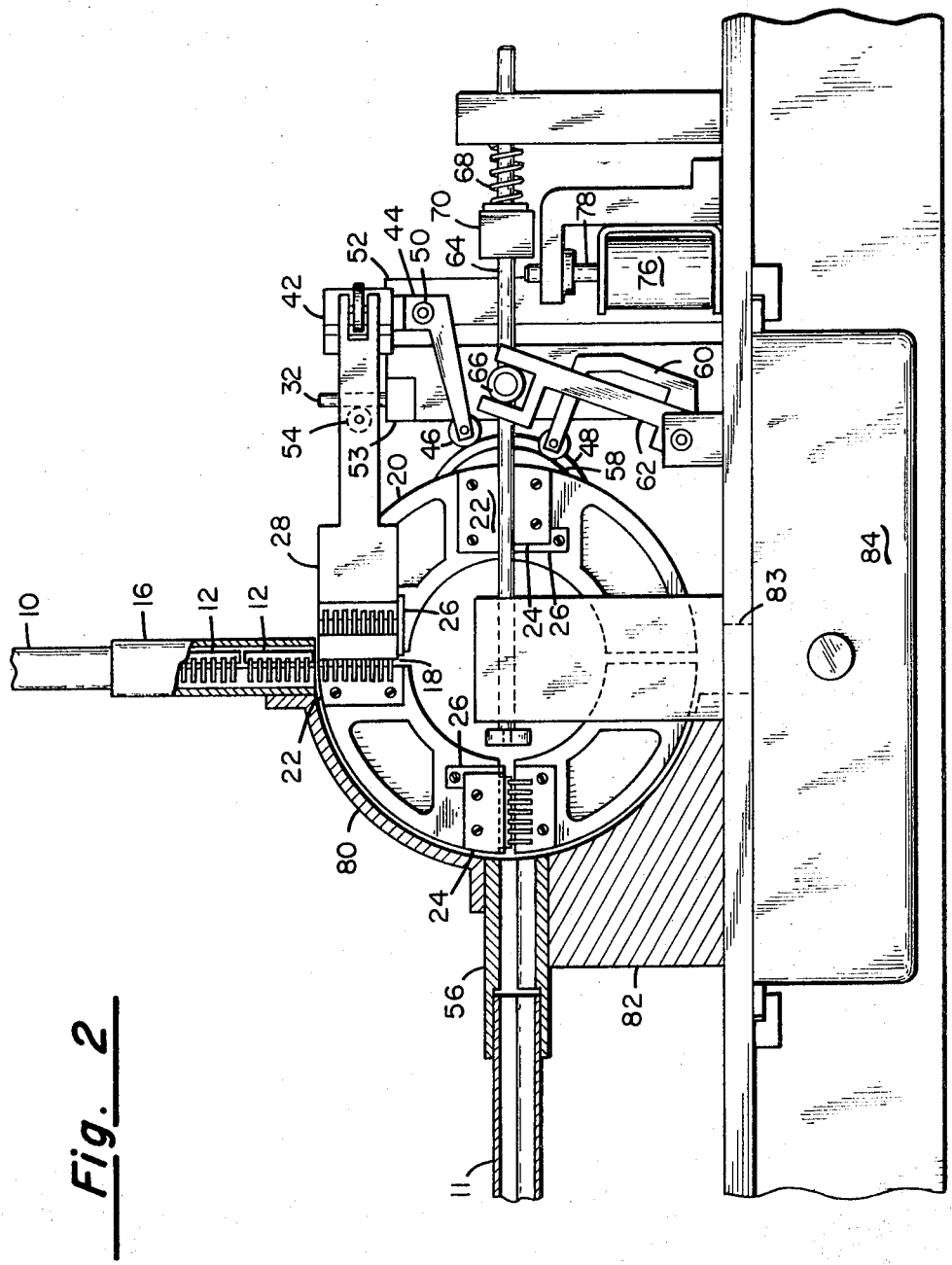

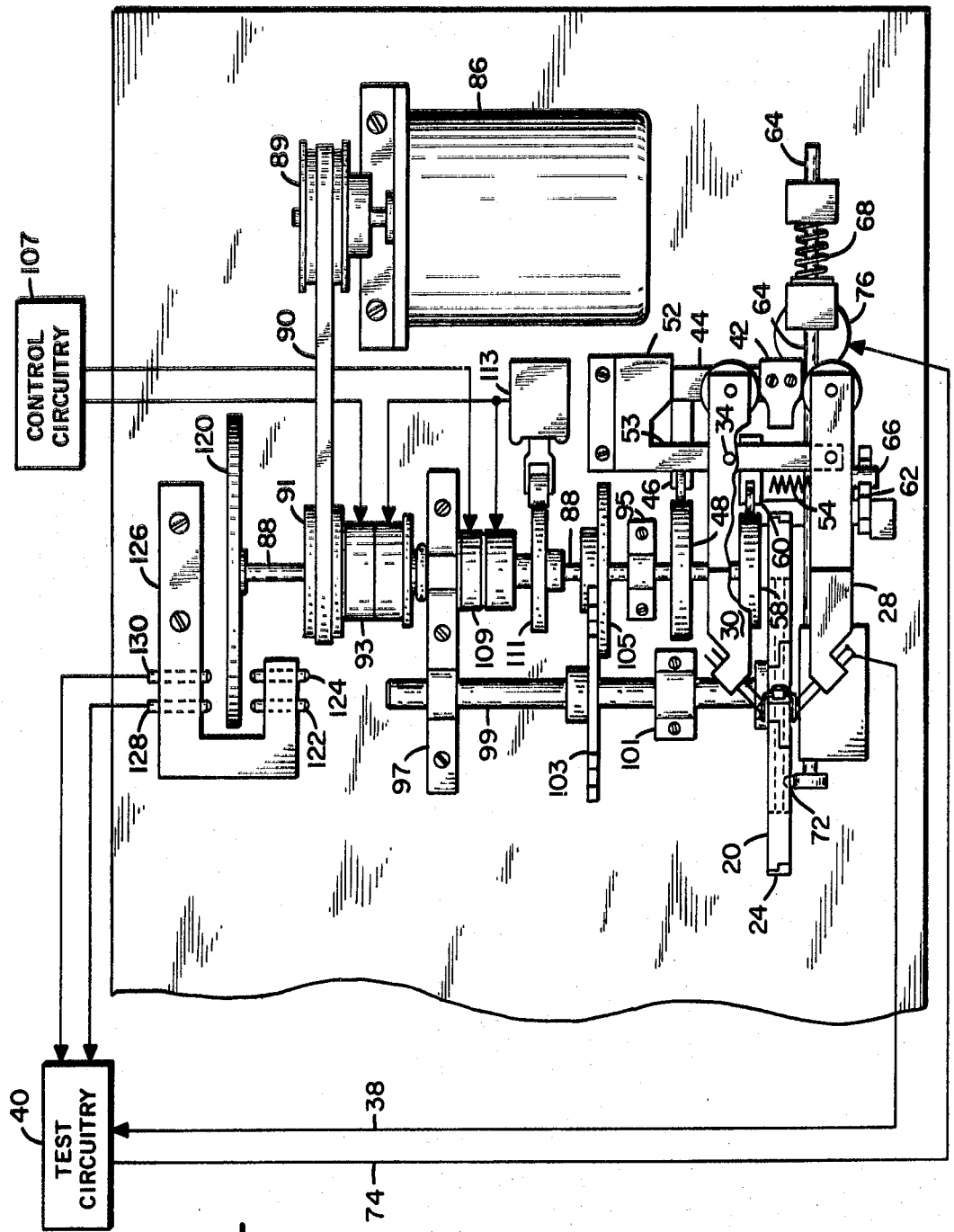

PATENTED APR 11 1972  3,655,041

INVENTORS
EUGENE A. VOSIKA
ALEXANDER BAKER

BY Stryker & Jacobson
ATTORNEYS

ELECTRONIC COMPONENT HANDLER AND TESTER

BACKGROUND OF THE INVENTION

Integrated circuits are finding increasing use in electronic devices and applications today requiring automated equipment to test each integrated circuit to insure its performance. Since the typical integrated circuit is very small with many leads therefrom a sophisticated machine is required in order to handle the circuits with a minimum of manual assistance and at a maximum rate. Prior art machines in this field of technology lack a number of desirable features necessary to achieve this end. For example, the machine should be able to accept integrated circuits directly from the package in which they are shipped and return them to the package after they are tested. The machine should be adaptable to different size integrated circuits with little modification. Furthermore, positive electrical connections to the integrated circuits should be afforded and the test initiated after full contact is established to avoid faulty tests and arcing. The circuits should also be handled quickly but delicately to avoid damaging the expensive components. All of these advantages and more are afforded by the present invention.

SUMMARY OF THE INVENTION

The type of integrated circuit handled by the present inventive device comprises a generally rectangular body with leads positioned in two rows one on each side of the body. This type of circuit is usually shipped in quantity in long plastic tubes. According to the present invention a slotted wheel is periodically rotated in a vertical plane. The shipping plastic tube is inserted into a feed manifold above the wheel which directs the integrated circuits, one each, into the slots of the wheel. The rectangular body rests in the slot with the leads along side the wheel. In this position multiple Kelvin type connectors close about the wheel so as to make two electrical connections to each lead. The connectors are pivoted into place by means of a suitable cam shaft and cam follower arrangement. Once in place, a light photodiode, which monitors the position of the cam shaft, signals the start of the test. Upon completion of a predetermined test interval the decision as to the quality of the integrated circuit is made by the test circuitry and stored while the wheel moves a quarter turn. In this new position the circuit is mechanically ejected into a second plastic shipping tube if that was the decision. If not, the ejector mechanism is blocked and the circuit falls from the wheel into a reject bin after the next quarter turn. Thus, it may be seen that it is an object of our invention to provide an improved integrated circuit handler. It is another object of our invention to provide a handler which is adaptable to different size circuits, tests only after the electrical connection is completed, and operates to receive circuits directly from their shipping tubes. Further objects and advantages will become apparent from the following description and drawings.

BRIEF DESCRIPTION OF THE DRAWINGS

FIG. 2 is an elevational plan view of the front of the machine showing some of the major components thereof.

FIG. 3 is a top view of the machine of FIG. 2 showing the drive mechanism in greater detail.

DESCRIPTION OF THE PREFERRED EMBODIMENT

Figure 1:
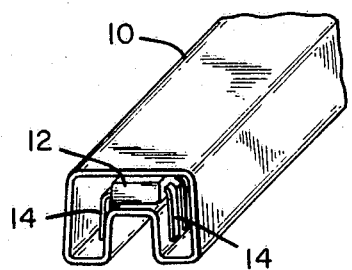
FIG. 1 is a perspective view of a portion of a typical shipping tube with a typical integrated circuit therein.

In FIG. 1 a portion of a typical plastic shipping tube 10 of the type used in he present invention is shown. A typical integrated circuit 12 with leads 14 is shown in the tube. A number of such circuits are usually shipped inserted end to end in a tube in the position shown. Reference should be had to FIG. 2. Tube 10 is inserted into a feed manifold 16 which is long enough to hold a sufficient quantity of circuits to keep the handler in operation during automatic mode operation while a new full tube 10 is inserted. The integrated circuits drop into a slot 18 in a wheel 20. Each slot 18 is defined by an electrically non-conducting insert 22 and a grooved guide insert 24. Small adjustment tabs 26 are positioned at the bottom of each slot 18 to determine the size of integrated circuit which can be handled. In the embodiment of FIG. 2 14 pin circuits are disclosed and tabs 26 are chosen to provide a proper slot length therefor.

Figure 4A:
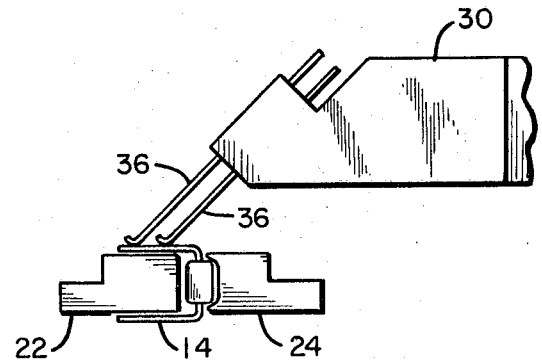
FIGS. 4a and 4b show in detail the construction of the contact arm and how it engages the integrated circuit leads.
Figure 4B:
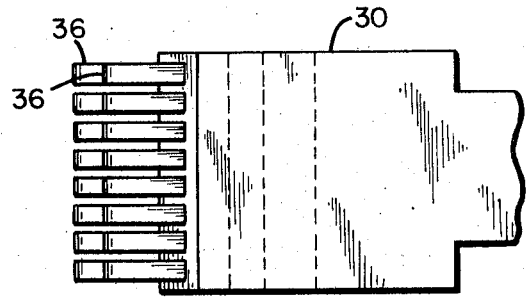

After wheel 20 comes into position and a circuit 12 drops into slot 18 wheel 20 stops since it is driven through a quarter turn at a time by means of a geneva mechanism which will be described later. At this point in time a pair of contact arms 28 and 30 pivot on a pair of pivot pins 32 and 34 so as to bring a set of contact elements 36 against leads 14 on integrated circuit 12. FIGS. 4a and 4b show in detail two views of the end of contact arm 30. As can be seen, each lead 14 is engaged by two separate contact elements 36 to ensure a proper electrical connection therewith. It may be seen in FIG. 4b that eight contact elements are provided on the contact arm. In the preferred embodiment only seven of these contact leads are used because of the 14 pin circuits being tested. However, conversion to a 16 pin circuit would be immediately possible because of the eight contact elements. It may also be seen, in FIG. 4a, how insert 24 is grooved to help position integrated circuit 12. Each pair of contact elements 36 is connected by suitable leads such as lead 36 in FIG. 3 to test circuitry 40. Referring again to FIG. 2, contact arms 28 and 30 are pivoted by the insertion of a spreading cam 42 which is activated by a lever 44 and a cam follower 46 which follows a cam 48. Lever 44 pivots at a mounting point 50 on a mounting block 52. Block 52 also has an extension 53 which serves to support pivot pins 32 and 34. Simultaneous reference to FIG. 3 will help in understanding the configuration of many of the recited components.

After a predetermined interval of time for testing, contact arms 28 and 30 are allowed to spread under the action of a spring 54 by the withdrawal of spreading cam 42. Wheel 20 then rotates through a quarter turn so as to line up slot 18 with an exit manifold 56 shown in section in FIG. 2. A cam 58 then presents a low spot to a cam follower 60 which is connected to an ejector restraining arm 62. Arm 62 restrains a spring driven ejector rod 64 by engaging a pin 66 thereon. Arm 62 moves to the left in FIG. 2 allowing a spring 68 to push a collar 70 and therefore rod 64 to the left. A small tongue 72 at the left end of rod 64 moves through slot 18 pushing circuit 12 into exit manifold 56, and into another shipping tube 11. Before the integrated circuit can be ejected into tube 11 an acceptance signal must be sent from the test circuitry along a line 74 to a solenoid 76 which retracts a pin 78 from in front of collar 70. If no acceptance signal is transmitted pin 78 blocks the leftward movement of rod 64 and the integrated circuit 12 remains in slot 18. A pair of guide members 80 and 82 (shown only in FIG. 2) ensure that the circuits remain in slot 18 during the rotational movements of wheel 20. However, the rejected integrated circuits fall through a hole 83 into a reject bin 84 at the end of the next quarter turn of wheel 20 upon clearing the end of guide 82.

In FIG. 3 the driving mechanism is shown. A motor 86 is connected to a cam drive shaft 88 by means of a pulley 89, a belt 90 and a free running pulley 91 which is connected to an electromagnetic clutch 93. Shaft 88 is supported by mounting blocks 95 and 97. Wheel 20 rotates with a shaft 99 which is carried by block 97 and a block 101. Intermittent quarter turn motion is transmitted to shaft 99 by a geneva type gear 103 and a driving gear 105. The operation of the handler may be automatic and repetitive or each cycle can be manually generated. In either case each cycle is initiated by a pair of signals from control circuitry 107 to clutch 93 and an electromagnetic brake 109. Brake 109 is normally applied to prevent any overtravel of the mechanism. The signals from control circuits 107 simultaneously release brake 109 and engage clutch 93 so as to initiate rotation of shaft 88 with pulley 91. As soon as rotation begins a cam 111 activates a microswitch 113 which takes over to maintain clutch 93 in engagement and brake 109 disengaged despite the discontinuance of signals from control circuits 107. After one complete revolution of shaft 88 and cam 111 a low spot on cam 111 again deactivates microswitch 113 so as to engage brake 109 and disengage clutch 93, thus, stopping shaft 88 at the initial beginning position.

Figure 5:
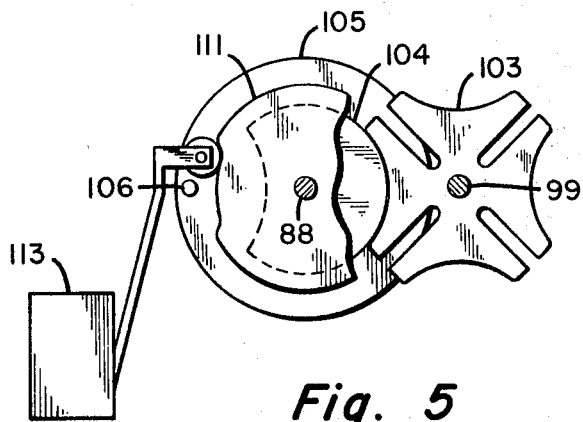
FIG. 5 shows the indexing cam and the geneva type movement.

FIG. 5 demonstrates the configuration of cam 111 with a low spot on one side to deactivate microswitch 113. Cam 111 is cut away in FIG. 5 to better show the geneva movement. Shaft 99 is locked in place by the hub 104 on gear 105 for most of the revolution of shaft 88. However, during a portion of the rotation a peg 106 enters the slot in gear 103 and rotates it through exactly a quarter turn. An indentation in hub 104 adjacent peg 106 permits this rotation. Thus, each complete revolution of shaft 88 generates exactly one quarter revolution in shaft 99 and wheel 20.

Figure 6:
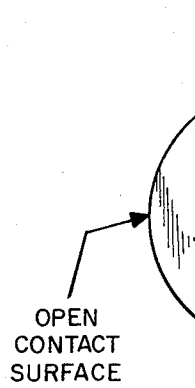
FIG. 6 shows the contact actuating cam.

Cam 48 is shown in detail in FIG. 6. It may be seen that during each revolution of shaft 88 contact arms 28 and 30 are held in a closed position for one half of the revolution during which wheel 20 is stationary and open for the other half of the revolution when wheel 20 is indexing.

Figure 7:
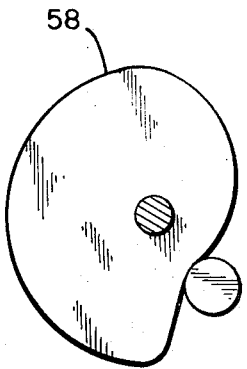
FIG. 7 shows the ejector actuating cam.

Cam 58 is shown in detail in FIG. 7. Cam 58 incorporates a sudden reduction in radius at a point so as to permit ejector rod 64 to move during the interval when wheel 20 is stationary.

Figure 8:
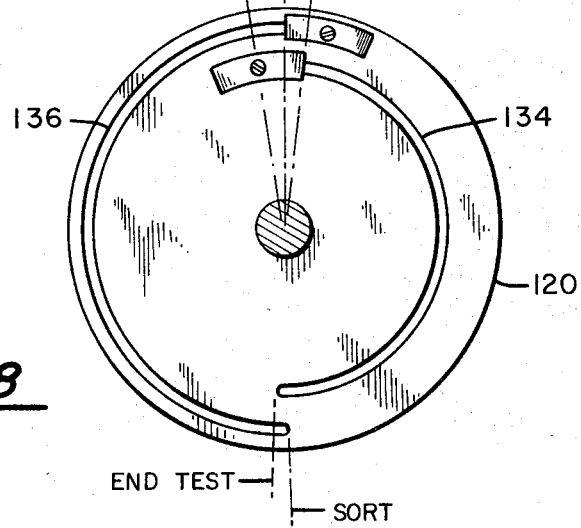
FIG. 8 shows the timing disc which controls the time of testing and the time of sorting.

Returning to FIG. 3 it may be seen that shaft 88 extends back to a timing disk 120. Two light sources 122 and 124 are mounted in a block 126 so as to shine through disc 120 to a pair of photodiodes 128 and 130. Photodiodes 128 and 130 are connected to test circuitry 40 so as to signal thereto the position of shaft 88. Reference to FIG. 8 will show the two semi-annular holes 134 and 136 in disc 120 which pass light from the two sources to the two photodiodes. As indicated in FIG. 8, disc 120 is positioned on shaft 88 so that angular position 138 is in front of diodes 128 and 130 at the moment contact elements 36 contact the leads of the integrated circuits. However, not until angular position 140 is reached does light pass through hole angular position 140 is reached does light pass through hole 134 energizing photodiode 130 and signaling test circuits 40 to begin the test. This brief delay guarantees that there is no lead damaging arcing between contact elements 36 and leads 14. The testing continues till the end of hole 134 is reached. Hole 136 starts just before the end of hole 134 thus activating photodiode 128 and signalling test circuitry 40 that an accept or reject decision must be made before the end of hole 134 is reached. This decision is made and held as long as light passes through hole 136. Hole 136 is, thus, made long enough to permit the rotation of wheel 20 through a quarter turn so that the integrated circuit may reach the eject position while the accept or reject decision is still held by test circuitry 40. If the decision is for acceptance then a signal is sent to solenoid 76 to retract pin 78 allowing the normal ejection sequence to take place as discussed earlier. If the decision is to reject, pin 78 is not retracted and therefore, the circuit is not ejected into manifold 56 and drops into reject bin 84 after the next quarter turn.

We claim:

1. An integrated circuit handling and testing machine comprising in combination:
    a wheel having a plurality of integrated circuit accepting slots in the periphery thereof in which at least the portions of the wheel adjacent one side of the slots comprise insulating material, said wheel being disposed for rotation in a substantially vertical plane;
    feed means positioned generally above said wheel adapted to gravity feed said circuits into said slots;
    receiving means positioned generally beside and below said wheel;
    testing means adapted to connect test circuitry to the leads from said circuits, said testing means comprising contact arms which contact the leads of the circuits by pressing the leads against the insulating material with contact elements in said contact arms while the circuits are in said slots;
    selector means operable to eject integrated circuits from said slots into one of said receiving means beside the wheel upon receiving an appropriate signal from said testing means; and means for periodically rotating said wheel.

2. The apparatus of claim 1 in which said testing means further comprises electronic test circuitry connected to the contact elements in said contact arms, which test circuitry is operable to determine the condition of said integrated circuit and connected to the selector means so as to control which receiving means said selector ejects the circuit into.

3. The apparatus of claim 2, in which said selector means comprises at least one spring driven member restrained by a first cam following means the rotation of the corresponding first cam allowing the spring driven member to periodically slide said circuits from said slots into one of said receiving means.

4. The apparatus of claim 3, wherein said contact arms are positioned on each side of said wheel and pivoted into contact with the leads of the circuits by the action of a second cam following means, the rotation of the corresponding second cam operating to periodically pivot said contact arms in coordination with said periodic rotation of the said wheel.

5. The apparatus of claim 4 wherein said first and second cams are carried by a cam drive shaft which shaft is connected to a motor by means of electrically activated clutch means and wherein said means for periodically rotating the wheel comprises a geneva movement between said wheel and said cam drive shaft.

6. The apparatus of claim 5 in which said test circuitry controls said spring driven member by activating a blocking pin which pin, upon activation, is retracted so as not to restrain movement of said spring driven member.

7. The apparatus of claim 6 including a disk on said cam drive shaft, a pair of light sources adapted to shine through said disk, and a pair of light detectors adapted to receive light when passed by the disc, said detectors connected to said test circuitry, said disc having a pattern of light transmitting portions arranged to pass light to said detectors and thereby signal to the test circuitry the position of said cam drive shaft and therefore the appropriate times at which to begin and end the test and activate the selector means.

8. The apparatus of claim 7 including guide members adjacent the periphery of said wheel so as to prevent said circuits from leaving said slots at locations other than those corresponding to said feed means and said receiving means.

9. The apparatus of claim 8 in which said receiving means comprises an accept and a reject portion said accept portion receiving circuits slid from said slots by said spring driven member and said reject portion comprising a receiving bin generally beneath said wheel adapted to receive unaccepted components which slide into said bin under the influence of gravity.

10. The apparatus of claim 9 including adjustable insert means in said slots adapted to vary the size of the slots to accommodate various sized circuits.

11. The apparatus of claim 10 in which two contact elements in the contact arm engage each lead in the circuits being tested.

* * * * *